United States Patent [19]

Mori et al.

[11] Patent Number: 4,791,214

[45] Date of Patent: Dec. 13, 1988

[54] BONDING AGENT AND RESIN COMPOSITION

[75] Inventors: Masahito Mori, Takatsuki; Masaaki So, Ibaraki; Hirohide Tomoyasu, Moriyama, all of Japan

[73] Assignee: Sunstar Giken Kabushiki Kaisha, Takatsuki, Japan

[21] Appl. No.: 886,152

[22] Filed: Jul. 16, 1986

[30] Foreign Application Priority Data

Jul. 18, 1985 [JP] Japan .................. 60-159584
Jul. 19, 1985 [JP] Japan .................. 60-160812

[51] Int. Cl.$^4$ .................................. C07F 7/10
[52] U.S. Cl. ...................... 556/423; 106/287.11; 556/413; 556/419
[58] Field of Search .............. 556/419, 423, 413; 106/287.11

[56] References Cited

U.S. PATENT DOCUMENTS 2,946,701 7/1960 Plueddemann .................. 556/418 X
3,032,577 5/1962 Morehouse .......................... 556/425

FOREIGN PATENT DOCUMENTS 54923    6/1982 European Pat. Off. ..... 556/419 UX
175447   3/1986 European Pat. Off. ..... 556/419 UX
2050235  4/1971 Fed. Rep. of Germany ...... 556/419 UX
2107360  8/1971 Fed. Rep. of Germany ...... 556/419 UX

*Primary Examiner*—Paul F. Shaver
*Attorney, Agent, or Firm*—Wegner & Bretschneider

[57] ABSTRACT

Improved bonding agent comprises a reaction product or mixture of an epoxyalkylalkoxysilane and a polyamine, and a resin composition comprising as the main ingredient conventional synthetic resin or synthetic rubber and the bonding agent as set forth above, which has excellent adhesion, particularly durability of adhesion, and is useful as an adhesive or a paint.

1 Claim, No Drawings

BONDING AGENT AND RESIN COMPOSITION

This invention relates to a bonding agent and a resin composition containing the bonding agent. More particularly, it relates to a bonding agent comprising a reaction product or mixture of an epoxyalkylalkoxysilane and a polyamine, and a resin composition containing the bonding agent for improving adhesion (particularly durability of adhesion) which is useful as an adhesive or a paint.

TECHNICAL BACKGROUND AND PRIOR ART

There have been known and practically used various resin compositions comprising as the main ingredient various synthetic resins or synthetic rubbers, for example, adhesives, sealants, paints, pouring agents, and the like. These resin compositions contain usually a bonding agent in order to improve the adhesion to the substrate to be applied in addition to conventional other additives, such as fillers, plasticizers, solvents, dyes and pigments, and flow modifiers. The conventional bonding agents are phenolic resins, petroleum resins, epoxy resins, silane coupling agents, titanate coupling agents and the like. However, these conventional bonding agents are not necessarily satisfactory in the durability of adhesion. It is also proposed to apply a primer to the substrate, but this is not preferable in view of the labor saving.

SUMMARY OF THE INVENTION

The present inventors have intensively studied as to improved bonding agent and resin composition containing the bonding agent, and have found that a reaction product or mixture of a specific alkoxysilane compound having an epoxy group and a compound containing two or more amino groups in the molecule exhibits excellent bonding force and hence is useful as a bonding agent and that a resin composition containing the bonding agent show excellent adhesion to the substrate and excellent durability of adhesion.

An object of the invention is to provide an improved bonding agent. Another object of the invention is to provide a resin composition having excellent adhesion, particularly excellent durability of adhesion. These and other objects and advantages of the invention will be apparent to skilled persons from the following description.

DETAILED DESCRIPTION OF THE INVENTION

The bonding agent of this invention comprises a reaction product or mixture of an epoxyalkyalkoxysilane and a polyamine.

The epoxyalkylalkoxysilane used in this invention includes, for example, γ-glycidoxypropyldimethylethoxysilane, γ-glycidoxypropylmethyldiethoxysilane, γ-glycidoxypropyltrimethoxysilane, β-(3,4-epoxycyclohexyl)ethyltrimethoxysilane, β-(3,4-epoxycyclohexyl)ethylmethyldimethoxysilane, and the like.

The polyamine used in this invention includes, for example, aliphatic polyamines (e.g. diethylenetriamine, diethylaminopropylamine, triethylenetetramine, etc.); modified aliphatic polyamines which are prepared by modifying the above-mentioned aliphatic polyamines with a modifier (e.g. bisphenol A, etc.); aromatic polyamines (e.g. diaminodiphenylmethane, diaminodiphenylsulfone, benzidine, etc.); modified aromatic polyamines which are prepared by converting the above-mentioned aromatic polyamines into an adduct with a monoepoxy group; alicyclic polyamines (e.g. 3,3'-dimethyl-4,4'-diaminodicyclohexylmethane, etc.); polyamidoamines which are prepared by reacting the above-mentioned aliphatic polyamines with a dimer acid; aliphatic polyether polyamines which are prepared by reacting these polyamines and an alkylene oxide (e.g. ethylene oxide, propylene oxide, etc.); and the like. Preferred one is aliphatic polyether polyamines having polypropylene glycol nucleus which have a molecular weight of 200–3,000, preferably 400–2,500.

The above epoxyalkylalkoxysilane and polyamine are mixed in an approximately stoichiometrically equivalent amount or they are reacted in such an amount, by which the desired bonding agent is prepared. The reaction is usually carried out in a suitable solvent, such as aromatic solvents (e.g. toluene, xylene, etc.), esters (ethyl acetate, butyl acetate, etc.), at a temperature of from room temperature to an elevated temperature (e.g. 40° to 60° C.) for 20 hours or longer. The bonding agent thus prepared is preferably used as an additive to various resin composition in an amount of 0.1 to 20 parts by weight (as solid), preferably 0.5 to 5 parts by weight, to 100 parts by weight of the resin composition in order to give the resin composition having excellent adhesion, particularly excellent durability of adhesion.

The resin composition of this invention comprises mainly a conventional synthetic resin and/or synthetic rubber and the bonding agent as set forth above, optionally other additives such as fillers, plasticizers, solvents, catalysts, antioxidants, pigments, etc.

The synthetic resins used as the main ingredient of the resin composition include conventional polyester resins, epoxy resins, alkyd resins, aminoalkyd resins, and the like, and the synthetic rubbers include conventional polyurethane rubber, silicone rubber, modified silicone rubber (i.e. a compound having polyether nucleus and terminal alkoxy group, and a compound having polyether nucleus and terminal isocyanate group, etc.), polysulfide rubber, and the like. Among these, polyester resins and polyurethane rubbers are preferable.

The resin composition of this invention has excellent adhesion to the substrates (e.g. metallic substances, coated metals, plastics, glass, inorganic materials, wooden products, etc.), particularly excellent durability of adhesion under heating or in water, and hence is useful as an adhesive or a paint.

This invention is illustrated by the following Examples, but should not be construed to be limited thereto.

EXAMPLES 1 TO 8

Preparation of bonding agents:

An epoxyalkylakoxysilane (Sila-Ace S-510 or -520, manufactured by Chisso K.K., Japan) and a polyamine (Epomic Q-604, -631, -640, and -691, manufactured by Mitsui Sekiyu Kagaku Epoxy K.K., Japan) and toluene are charged into a closed reactor in an amount as shown in Table 1, and the mixture is reacted at 50° C. for 24 hours. By checking the disappear of epoxy group and secondary amino group by IR, the finishing of the reaction is confirmed. The reaction product is used as the bonding agent.

The silane compounds and polyamines used above are as follows:
Sila-Ace S-510:

Sila-Ace S-510:

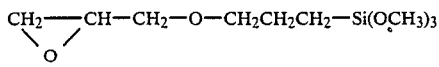

Sila-Ace S-520:

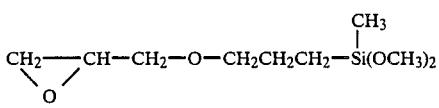

Epomic Q-604: modified aliphateic polyamine
Epomic Q-631: modified alicyclic polyamine
Epomic Q-640: modified aromatic polyamine
Epomic Q-691: aliphatic polyether polyamine

TABLE 1

| Reactants | Example No. | | | | | | | |
|---|---|---|---|---|---|---|---|---|
| | 1 | 2 | 3 | 4 | 5 | 6 | 7 | 8 |
| Sila-Ace S-510 | 24 | 24 | 24 | — | — | — | — | 24 |
| Sila-Ace S-520 | — | — | — | 22 | 22 | 22 | 22 | — |
| Epomic Q-604 | 4 | — | — | 4 | — | — | — | — |
| Epomic Q-631 | — | 10 | — | — | 10 | — | — | — |
| Epomic Q-640 | — | — | 11 | — | — | 11 | — | — |
| Epomic Q-691 | — | — | — | — | — | — | 6 | 6 |
| Toluene | 110 | 130 | 140 | 100 | 126 | 130 | 112 | 120 |

Test of bonding force of the bonding agents:

A urethane rubber adhesive (Pandex T-5205, manufactured by Dainippon Ink Kagaku Kogyo K.K., Japan) was diluted with a mixture of toluene and methyl ethyl ketone so as to be in a concentration of 15% by weight (in solid). To the solution (100 parts by weight) was added the bonding agent (1 part by weight) as prepared in the above Examples 1 to 8. The thus prepared bonding composition was applied to lamination of a Zn steel plate and a polyvinyl chloride (PVC) sheet. The adhesion (dry adhesion strength) of the laminates was tested in a known method [peeling strength after keeping at 20° C., 65% RH (relative humidity) for 24 hours]. As a result, they showed a dry adhesion strength of 4.4 kg/25 mm.

As a reference, a laminate was prepared by using the same urethane rubber adhesive containing no bonding agent, and the dry adhesion strength was measured likewise. As a result, the product showed a dry adhesion strength of 0.3 kg/25 mm.

EXAMPLES 9 TO 17

Preparation of resin compositions:

A polyurethane rubber (Pandex T-5205, manufactured by Dainippon Ink Kagaku Kogyo K.K., Japan) or a polyester resin (Dynapol 411, manufactured by Dynamite Nobel Co.), toluene, methyl ethyl ketone (MEK) and the bonding agent (as prepared in Examples 1 to 8) are mixed with stirring in an amount as shown in Table 2 to prepare the main ingredient. The main ingredient is incorporated with triphenylmethane triisocyanate (Desmodule R, manyfactured by Bayer, as a crosslinking agent) to prepare an adhesive composition.

Test of adhesion of the resin compositions:

The adhesion prepared in the above Examples 9 to 17 was applied to one surface of a Zn steel plate with an air spraying device (in weight of 150 g/m$^2$), and it was dried at 80° C. for 2 minutes, and thereafter, the coated steel plate was piled on a polyvinyl chloride foam (Olsia MP-877, manufactured by Sunstar Giken K.K., Japan), and the piled product was heated at 140° C. for 5 minutes, pressed with a roler (0.8 kg/cm$^2$ × 20 seconds) to prepare a test piece.

The test piece was subjected to the test of dry adhesion strength (peeling resistance after keeping at 20° C., 65% RH (relative humidity) for 24 hours), the test of heat aging resistance (peeling resistance after keeping at 100° C. for 7 days), and the test of water resistance (peeling resistance after keeping at 20° C. for 7 days). The results are shown in Table 2.

TABLE 2

| Components | Example Nos. | | | | | | | | | Ref. Ex. No. 1 |
|---|---|---|---|---|---|---|---|---|---|---|
| | 9 | 10 | 11 | 12 | 13 | 14 | 15 | 16 | 17 | |
| Pandex T-5205 | 15 | 15 | 15 | 15 | 15 | 15 | 15 | 15 | — | 15 |
| Dynapol 411 | — | — | — | — | — | — | — | — | 15 | — |
| Toluene | 43 | 43 | 43 | 43 | 43 | 43 | 43 | 43 | 43 | 43 |
| MEK | 43 | 43 | 43 | 43 | 43 | 43 | 43 | 43 | 43 | 43 |
| Bonding agent (in solid) | | | | | | | | | | |
| Ex. 1 | 1 | — | — | — | — | — | — | — | 1 | — |
| Ex. 2 | — | 1 | — | — | — | — | — | — | — | — |
| Ex. 3 | — | — | 1 | — | — | — | — | — | — | — |
| Ex. 4 | — | — | — | 1 | — | — | — | — | — | — |
| Ex. 5 | — | — | — | — | 1 | — | — | — | — | — |
| Ex. 6 | — | — | — | — | — | 1 | — | — | — | — |
| Ex. 7 | — | — | — | — | — | — | 1 | — | — | — |
| Ex. 8 | — | — | — | — | — | — | — | 1 | — | — |
| Desmodule R | 5 | 5 | 5 | 5 | 5 | 5 | 5 | 5 | 5 | 5 |
| Dry adhesion strength (kg/25 mm) | 4.0 | 4.1 | 4.2 | 4.1 | 4.1 | 4.3 | 4.0 | 4.0 | 4.0 | 1.2 |
| Heat aging resistance (kg/25 mm) | 3.9 | 4.1 | 4.0 | 3.9 | 4.0 | 4.1 | 4.2 | 4.2 | 4.1 | 0.3 |
| Water resistance (kg/25 mm) | 3.2 | 3.4 | 3.3 | 3.2 | 3.2 | 3.3 | 3.4 | 3.4 | 3.3 | Spontaneously peeled |

What is claimed is:

1. A bonding agent which comprises a reaction product of an epoxyalkylalkoxysilane selected from the group consisting of γ-glycidoxypropyldimethylethoxysilane, γ-glycidoxypropylmethyldiethoxysilane, γ-glycidoxypropyltrimethoxysilane, β-(3,4-epoxycyclohexyl)ethyltrimethoxysilane and β-(3,4-epoxycyclohexyl)ethylmethyldimethoxysilane, and an aliphatic polyether polyamine having polypropylene glycol nucleus and having a molecular weight of 200 to 3,000.

* * * * *